United States Patent Office 2,802,878
Patented Aug. 13, 1957

2,802,878

1-ETHYNYL-CYCLOHEXYLOXYALKANOLS

Roger F. Monroe and Arthur W. Anderson, Midland, Mich., assignors to The Dow Chemical Company, Midland, Mich., a corporation of Delaware No Drawing. Application August 2, 1956,
Serial No. 601,649

4 Claims. (Cl. 260—611)

This invention relates to the 1-ethynyl-cyclohexyloxy-alkanols having the formula

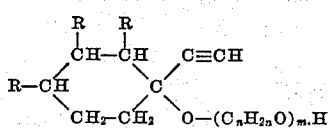

In this and succeeding formulas, $n$ represents one of the integers 2 and 3, $m$ represents one of the integers 1 and 2, and one of the R symbols represents methyl or hydrogen and the remaining R symbols represent hydrogen. These compounds are colorless liquids somewhat soluble in many organic solvents and of very low solubility in water. They have been found to be active as plant growth control materials and are adapted to be employed as active toxic constituents of dust and spray compositions for the control of the growth of weeds and for the sterilization of soil with regard to plant growth. The compounds are also useful as corrosion inhibitors in acid solutions.

The new compounds may be prepared by the reaction of ethylene oxide or propylene oxide with a 1-ethynyl-cyclohexanol of the formula

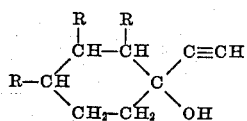

to introduce one oxyalkylene unit or a chain of two oxyalkylene units for the hydroxyl hydrogen in the 1-ethynyl cyclohexanol molecule. The number of oxyalkylene units introduced into the molecule is somewhat dependent upon the conditions under which the reactants are brought together and upon the molar ratio of employed 1-ethynyl-cyclohexanol and alkylene oxide. Thus, the reaction of 1 molecular proportion of 1-ethynyl-cyclohexanol with one or two molecular proportions of alkylene oxide, depending upon whether it is desired to introduce one or two alkylene oxide units in the molecule, gives optimum yields of the desired product. The reaction between the 1-ethynyl-cyclohexanol and alkylene oxide is carried out in the presence of a catalyst such as triethylamine and takes place smoothly at temperatures of from 70° to 175° C. and under a pressure of from 125 to 175 pounds per square inch.

In carrying out the reaction, the 1-ethynyl cyclohexanol, alkylene oxide and catalyst are mixed together in a reactor, and the resulting mixture heated at a temperature of from 70° to 175° C. and under an autogenous pressure of from 125 to 175 pounds per square inch. Upon completion of the reaction, the reaction mixture is fractionally distilled under reduced pressure to separate the desired product as a water white liquid.

The following examples illustrate the invention but are not to be construed as limiting:

*Example 1.—1-(1-ethynyl-cyclohexyloxy)-2-propanol*

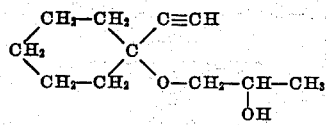

An autoclave from which the air was substantially removed was charged with 2630 grams (21 moles) of 1-ethynyl cyclohexanol, 1351 grams (23.5 moles) of propylene oxide and 13.9 grams (0.1 mole) of triethyl amine. The resulting mixture was heated slowly from 70° to 110° C. over a period of 3 hours, then from 110° to 125° C. over a period of one hour, then from 125° to 140° C. over a period of 1.25 hours and finally from 140° to 175° C. over a period of one hour. The heating was carried out under autogenous pressure; maximum pressure throughout the heating period being 150 pounds per square inch. Following the heating period, the reactor was cooled and the crude reaction mixture fractionally distilled under reduced pressure. As a result of these operations, there was separated a 1-(1-ethynyl-cyclohexyloxy)-2-propanol product as a water white liquid boiling at 84° C. at 1 millimeter pressure and having a refractive index $n/D$ of 1.4726.

*Example 2.—2-(1-ethynyl-cyclohexyloxy)-ethanol*

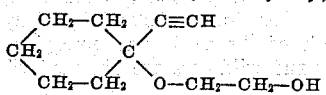

Twenty moles of 1-ethynyl cyclohexanol, 22 moles of ethylene oxide and 0.1 mole of triethyl amine were placed in an autoclave from which the air was substantially evacuated. The resulting mixture was heated under autogenous pressure at temperatures gradually increasing from 70° to 175° C. at 150 pounds per square inch. The heating was carried out over a period of 6 hours. Following the heating period, the reactor was cooled and the crude reaction mixture fractionally distilled under reduced pressure to separate a 2-(1-ethynyl-cyclohexyloxy)-ethanol product as a water white liquid boiling at 73°–74° C. at 1 millimeter pressure and having a refractive index $n/D$ of 1.4811 at 25° C.

*Example 3.—2-[2'-(1-ethynyl-cyclohexyloxy)-ethoxy]-ethanol*

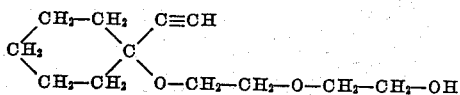

The reaction mixture as subjected to fractional distillation under reduced pressure in Example 2 was further distilled under reduced pressure to separate a 2-[2'-(1-ethynyl-cyclohexyloxy)-ethoxy]-ethanol product as a water white liquid boiling at 105° C. at 0.1 millimeter pressure and having a density of 1.037 at 25° C.

*Example 4.—1-(1-ethynyl-2-methyl-cyclohexyloxy)-2-propanol*

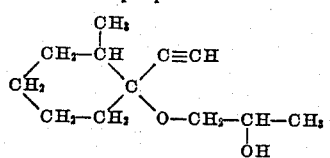

This compound is prepared in a manner similar to that described in Example 2 by heating equimolecular proportions of 1-ethynyl-2-methyl-cyclohexanol (boiling at 29° C. at 0.5 millimeter pressure) and propylene oxide in the presence of a catalytic amount of triethyl amine at temperatures gradually increasing up to 175° C. at 150 pounds pressure per square inch. A 1-(1-ethynyl-2-methyl-cyclohexyloxy)-2-propanol product is separated by fractional distillation of the reaction mixture under reduced pressure. This product is a water white liquid having a molecular weight of 196.

*Example 5.—2-(1-ethynyl-4-methyl-cyclohexyloxy)-ethanol*

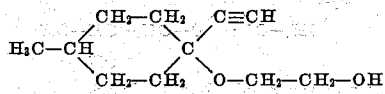

One mole each of 1-ethynyl-4-methyl-cyclohexanol and ethylene oxide are heated in the presence of two grams of triethyl amine in the same manner and under the same conditions as those described in Example 2. Fractional distillation under reduced pressure of the reaction mixture yields a 2-(1-ethynyl-4-methyl-cyclohexyloxy)-ethanol product as a water white liquid having a molecular weight of 182.

The new compounds of the present invention are effective as herbicides for the killing of weeds and for the sterilization of soil with regard to plant growth. For such use the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents of oil-in-water emulsions or aqueous dispersions with or without the addition of wetting, dispersing or emulsifying agents. In representative operations, substantially complete controls of the growth of the seeds and emerging seedlings of radish, millet and wild oats are obtained with 1-(1-ethynyl-cyclohexyloxy)-2-propanol when applied at the rate of 12.5 pounds per acre to soil previously planted with the named seed species.

The 1-ethynyl-cyclohexanol and 1-ethynyl-methyl-cyclohexanols employed as starting materials as herein described may be prepared by reacting cyclohexanone or a methyl-cyclohexanone with sodium acetylide to produce a sodium salt of 1-ethynyl-cyclohexanol or 1-ethynyl-methyl-cyclohexanol. The salt compound is then hydrolyzed with sulfuric acid to obtain the desired starting material. In the first phase of the reaction, the cyclohexanone is reacted portionwise with an equimolar amount of sodium acetylide in the presence of liquid ammonia and at or below the temperature at which ammonia is liquid at atmospheric pressure. Following the initial phase of the reaction, the reaction mixture is made slightly acid with sulfuric acid and thereafter fractionally distilled under reduced pressure to separate the desired starting material.

We claim:

1. A compound having the formula

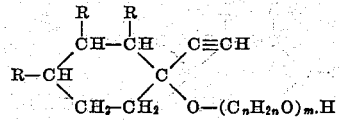

wherein $n$ represents one of the integers 2 and 3, $m$ represents one of the integers 1 and 2, and one of the R symbols represents a member of the group consisting of methyl and hydrogen and the other R symbols represent hydrogen.

2. 2-(1-ethynyl cyclohexyloxy)-ethanol.
3. 1-(1-ethynyl cyclohexyloxy)-2-propanol.
4. 2-[2'-(1-ethynylcyclohexyloxy)-ethoxy]-ethanol.

No references cited.